United States Patent [19]
Russell

[11] 3,731,579
[45] May 8, 1973

[54] TRIMMING GUIDE FOR MEAT

[76] Inventor: Herman F. Russell, 13900 Cherrylawn, Detroit, Mich. 48238

[22] Filed: Apr. 13, 1971

[21] Appl. No.: 133,662

[52] U.S. Cl. .................83/802, 30/293, 83/522, 83/809
[51] Int. Cl. ...............................B26d 1/46
[58] Field of Search..................146/102 G, 130, 143; 143/26 R, 26 A, 26 B, 157, 159 R, 159 B, 159 L, 159 N, 168 R, 168 A, 168 B, 171; 83/201, 522; 30/286, 289, 290, 293, 274

[56] References Cited

UNITED STATES PATENTS

| | | | |
|---|---|---|---|
| 2,478,046 | 8/1949 | Higgs | 30/293 |
| 2,538,456 | 1/1951 | Howe, Jr. | 143/159 B |
| 2,830,369 | 4/1958 | Long | 30/293 X |
| 2,850,055 | 9/1958 | Lasar | 83/201 X |
| 2,401,972 | 6/1946 | Sellmeyer | 83/201 |

Primary Examiner—Andrew R. Juhasz
Assistant Examiner—James F. Coan
Attorney—Clarence A. O'Brien and Harvey B. Jacobson

[57] ABSTRACT

A vertically orientated plate-like member pivotally mounted on a meat saw so as to be vertically adjustable within the path of movement of meat being cut and swingable vertically in response to meat passing thereunder. The member is mounted for lateral adjustment toward and away from the blade of the machine and is adapted to ride along the lean line of the meat so as to act as a guide along which the meat can be moved to insure the retaining of a predetermined amount of fat thereon. The plate-like member, positioned laterally of the blade, also effectively acts as a guard against accidental contact with the blade by the meat handler.

8 Claims, 6 Drawing Figures

3,731,579

Herman F. Russell
INVENTOR.

BY *Clarence A.O'Brien*
*and Harvey B. Jacobson*
Attorneys

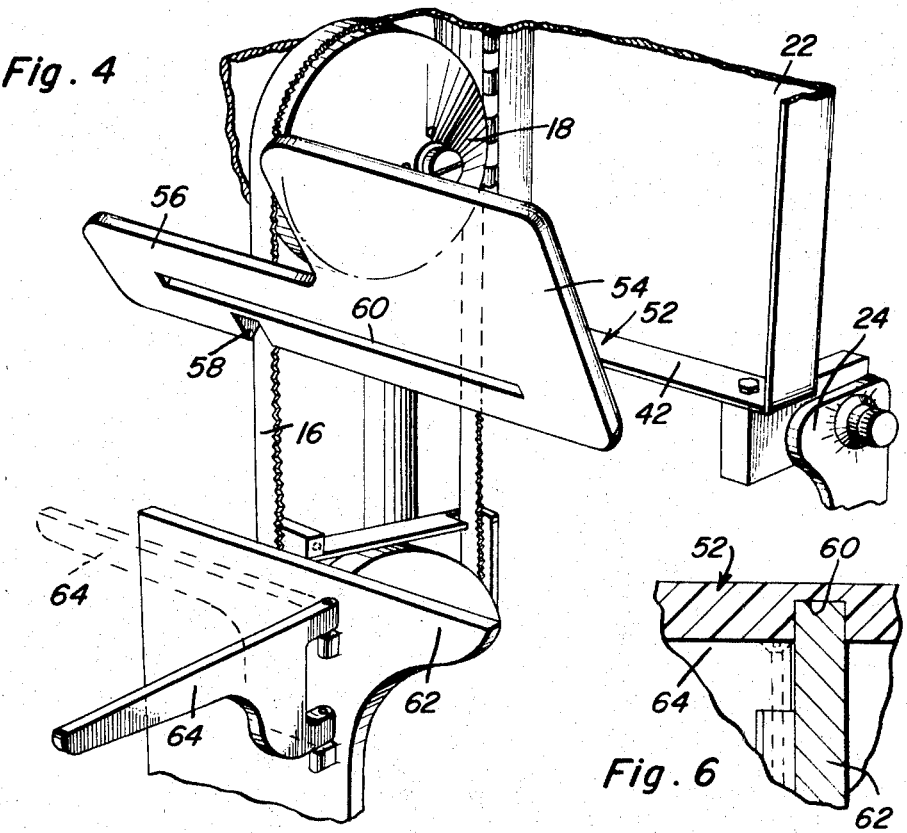
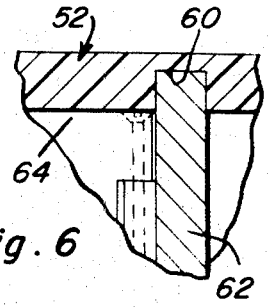
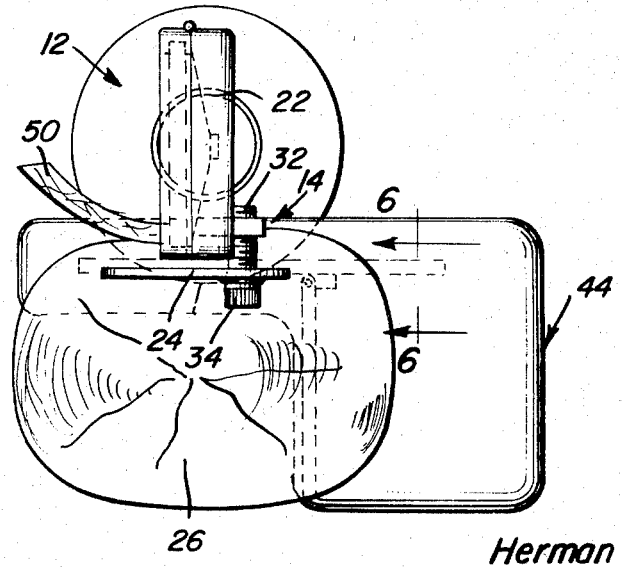
Herman F. Russell
INVENTOR.

TRIMMING GUIDE FOR MEAT

The invention herein is generally concerned with the handling of meat, and more particularly relates to a unique combination meat trimming guide and guard which functions so as to effectively separate the meat handler from the cutting blade and provide an accurate gauge to insure an accurate trimming of the meat.

It is a primary object of the instant invention to provide a unique trimming guide for meat which mounts outward of the cutting blade of a meat cutting machine for a riding thereof directly on the lean or red meat line of a steak, roast or the like so as to provide a clearly visible means for accurately positioning and guiding the meat throughout the entire passage thereon during the trimming operation.

Other significant objects of the instant invention reside in the provision of a trimming guide which can be adjusted to trim the meat in a manner whereby the amount of edge fat retained can be varied as desired, the guide automatically adjusting itself so as to accommodate meats of various thicknesses, as well as meats of irregular thicknesses.

Further objects include the provision of a quide which, while unique in construction and manner of operation, is structurally simple, capable of being accommodated to substantially any type of conventional meat cutting saw, and usable by even unskilled persons, requiring only a minor dial adjustment and a guiding of the red meat line along a plate edge to achieve a perfect trimming of the meat.

The invention herein also involves a removable table provided so as to receive and position the meat throughout the movement thereof beneath the guide.

The final object to be specifically innumerated is to provide a meat trimming guide which, because of the unique structural make up and positioning thereof, provides an effective guard between the moving saw blade and the meat handler.

Basically, the objects of the instant invention are achieved by the provision of a vertically orientated plate-like member mounted on a meat cutting saw machine laterally of the blade so as to overlie a piece of meat as it is moved through the blade for a trimming of the edges thereof. The guide is pivotally mounted so as to ride along the surface of the meat, rising and falling as the thickness of the meat dictates. The lower edge of the member is to provide a guide along which the lean or red meat line of the meat is to follow so as to achieve a severing of the edge material or fat over a predetermined distance from the lean line. The plate-like member is adjustable toward and away from the blade to vary the thickness of the fat retained. The support table along which the meat moves is removable and incorporates a downwardly directed groove which receives the upper edge of a vertical mounting plate, the table being stabilized by a foldable underlying laterally directed arm.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 4 is a perspective detail illustrating the removable table construction;

FIG. 5 is a plan view of the machine with the features of the instant invention associated therewith; and FIG. 6 is an enlarged cross-sectional detail taken substantially on a plane passing along line 6—6 in FIG. 5.

Figure 1:
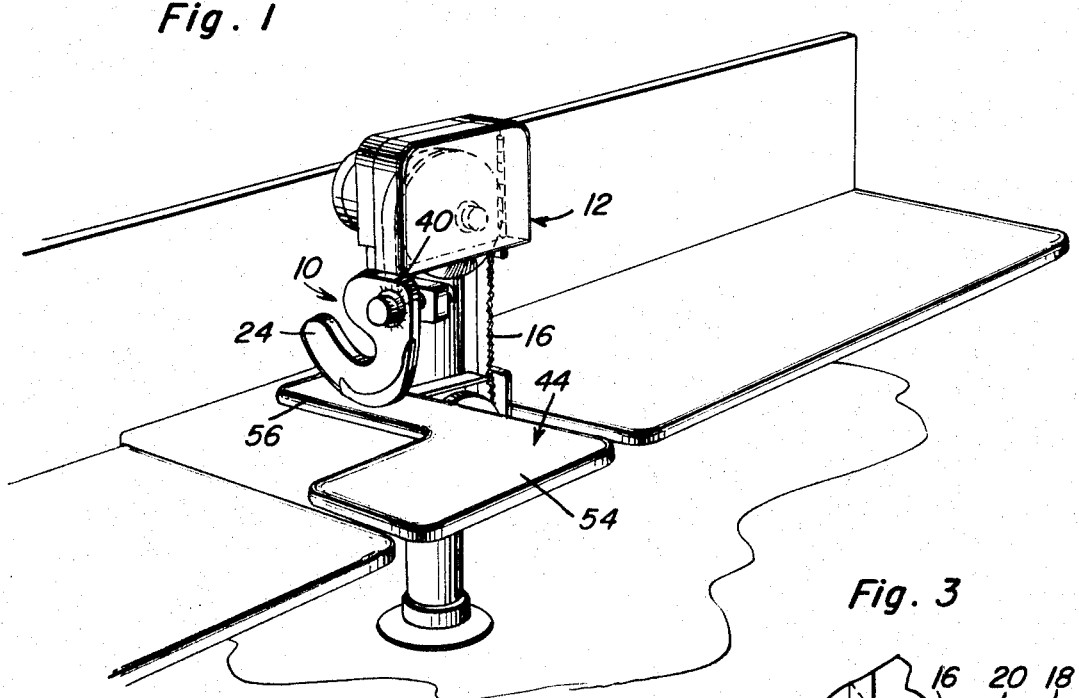
FIG. 1 is a perspective view of a meat cutting machine incorporating the trimming guide and table structure of the instant invention.
Figure 3:
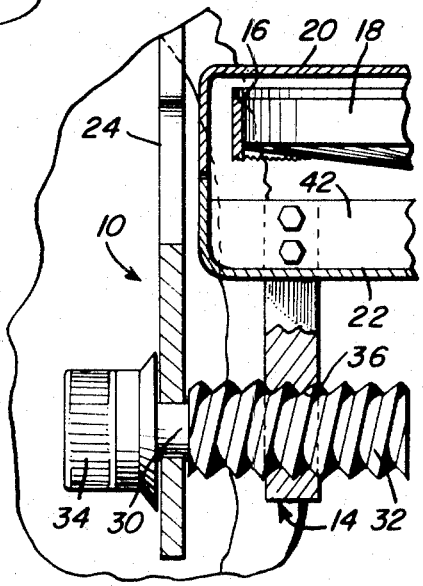
FIG. 3 is a horizontal detail view, with portions broken away, illustrating the mounting of the guide.
Figure 2:
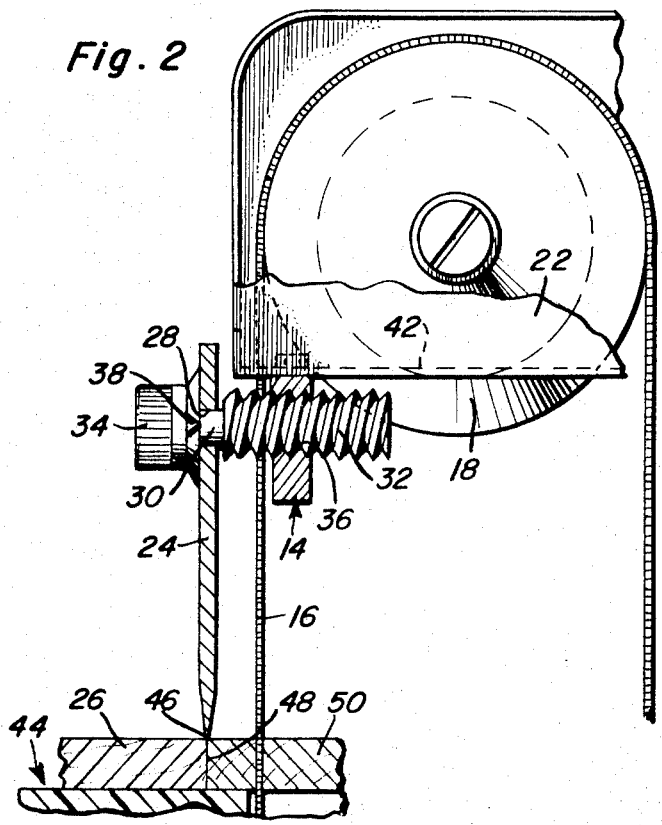
FIG. 2 is an enlarged cross-sectional view through the machine mounted guide illustrating its use in conjunction with a piece of meat.

Referring now more specifically to the drawings, reference numeral 10 is used to generally designate the trimming guide of the instant invention. This guide 10 is to be mounted on an appropriate meat cutting or trimming saw machine 12 utilizing an appropriate bracket 14.

For purposes of illustration, the saw machine 12 has been represented as a meat cutting bandsaw, incorporating a vertically traveling blade 16 engaged over upper and lower blade pulleys 18. The upper pulley is received within a housing 20 having a swinging door 22 selectively exposing or enclosing the upper pulley 18.

The trimming guide 10 includes an enlarged vertically orientated plate 24 positioned laterally of the forward or cutting run of the blade 16 so as to overlie the path taken by the meat 26 as it is advanced through the blade. The plate or plate-like member 24 has an enlarged aperture 28 through the upper portion thereof which rotatably receives a smooth cylindrical portion 30 of an elongated threaded shaft 32 therethrough. Mounted on the shaft 32 outward of the smooth portion 30 is an enlarged dial 34 which, in conjunction with the diametrically enlarged threaded portion of the shaft 32 acts so as to rotatably confine the plate 24 therebetween.

The shaft 32 is threadedly received through an internally threaded hole 36 through the mounting plate 14 whereby a variation in the distance between the plate 24 and the mounting plate or bracket 14 can be effected by a rotation of the shaft 32. The dial 34 on the shaft 32 has an appropriate pointer 38 thereon while the plate 24, about the dial 34, includes indicia 40 which provides a visual indication of the spacing between the guide plate 24 and the cutting run of the blade 16 behind which the bracket 14 is located.

While not specifically limited thereto, one convenient manner of mounting the bracket 14 is through a direct bolting of one end portion thereof to the bottom flange 42 of the pivotally mounted door 22, the bracket 14 being orientated in inwardly spaced parallel relation to the cutting run of the blade 16. Mounted in this manner, the threaded shaft 32 being positioned forward of the blade and in the direction of opening of the door 22, it will be appreciated that a forward opening movement of the door 22 will carry the bracket 14 and guide plate 24 therewith so as to move the plate 24 away from the blade as the interior of the machine is exposed for cleaning, maintenance and the like.

The pivotal movement of the plate 24 on the portion 30 of the shaft 32 is such so that the plate, in the plane thereof, has the rear portion thereof overbalanced downward so as to swing downwardly until stopped by the underlying table 44. The vertically orientated plate 24 is, at the same time, freely upwardly swingable upon the introduction of meat 26 therebelow by sliding along the table 44. The downward overbalancing of the plate 24 results in a continuous engagement of the lower edge 46 of the plate 24 with meat moving therebeneath. This lower edge 46 is specifically intended to guide along the lean or red meat line 48 of the meat 26 and may, for increased accuracy, be beveled or slightly sharpened so as to provide line contact with the lean line 48.

The plate 24 has been illustrated as including an arcuate configuration having a rounded lower edge. However, it will be appreciated that other configurations will also be appropriate, although the utilization of an arcuate lower edge is preferred so as to facilitate the sliding movement of the meat therebeneath and the corresponding automatic elevation of the lower edge 46 of the plate 24. It will of course be preferred that the point or area of contact of the lower edge 46 of the plate 24 with the meat be in approximate lateral alignment with the cutting edge of the blade 16. Further, the plate 24 can be made of any appropriate rigid material which will not contaminate the meat.

In use, the plate 24 is laterally adjusted relative to the cutting run of the blade 16, through a rotation of the dial 34 and an alignment with the calibrated indicia 40, so as to retain a specific predetermined spacing therebetween whereby, as the meat 26 is moved under the plate 24 with the lean line 48 guided beneath and in alignment with the plate edge 46, a predetermined amount of the edge fat 50 will be retained, and the excess removed from the meat 26. For example, if a maximum of ½ inch of edge fat is to be retained, the plate 24 will be positioned ½ inch from the blade 16 and the meat, guided in the aforementioned manner, passed through the saw, resulting in a removal of any edge fat greater than ½ inch in width.

It will also be appreciated that the plate 24, by its very nature, will act as a self-adjusting guard, protecting both the meat handler and the blade itself against the introduction of foreign objects.

It is also contemplated that the meat handling table 44 be specifically constructed so as to provide adequate support for the meat and at the same time be of a collapsible nature for easy storage. Basically, the table 44 includes a flat top or top panel 52 which includes a relatively wide forward portion 54 and a narrower integral rear portion 56 along that side of the table to be positioned against the saw machine 12. The table top panel 52 fits closely against the machine and includes a saw blade accommodating notch 58 along the edge thereof. In addition, the panel 52, through the bottom face thereof, includes an elongated narrow groove or recess 60 which extends for a major length of the panel 52. This recess 60 is received over and removably seats the elongated upper edge of a vertical support panel 62 rigidly positioned relative to the machine 12. This support panel in turn mounts, slightly below the panel groove's seating upper edge thereof, an elongated arm 64 swingable between a first position projecting laterally outward from the support panel 62 so as to underlie the forward wider portion 54 of the table panel 52, and a second rearwardly folded position against the vertical support panel 62 when a removal of the panel 52 and a collapsing of the assembly is desired for storage purposes. If deemed desirable, appropriate stop means can be associated with the arm 64 so as to stabilize the arm 64 in its laterally projecting top supporting position.

From the foregoing, it will be appreciated that unique meat cutting saw accessories have been set forth, such accessories including a combination trimming guide and cutting guard which is specifically constructed so as to directly cooperate with the meat as it is being cut, and at the same time, automatically adjust to varying thicknesses in the meat whereby a continuing guiding of the meat is effected throughout the entire cutting operation. The invention herein also includes a uniquely constructed removable support table utilized in conjunction with the guide for a proper support of the meat during the cutting operation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. An accessory for a meat trimming saw incorporating a cutting blade past which a piece of meat is moved to sever an edge portion therefrom, said accessory comprising a plate-like member positionable laterally of the blade to overlie the meat being trimmed thereby, means mounting said member for lateral adjustment toward and away from the blade, said member being vertically adjustable to accommodate meats of various thicknesses therebelow, said member being pivotally adjustable about a horizontal axis whereby the vertical adjustment of said member is effected by a pivoting of the plate about the axis, said member being overbalanced downward whereby vertical adjustment is automatic in accordance with the thickness of the meat passing therebelow, said member incorporating a lower edge which defines a guide edge along which the lean line of meat is guided to sever excess edge fat beyond a predetermined thickness, said guide edge being arcuate, the means mounting said member comprising a bracket fixed to the saw and an elongated threaded shaft adjustably threaded through said bracket, said shaft pivotally mounting said member and defining said horizontal axis, said member being enlarged and constitutes a guard between the cutting blade and the meat handler, and a horizontal table top projecting laterally from said blade under and beyond said member, a vertical support plate underlying said top, said top having a groove defined in the undersurface thereof, said groove releasably receiving the top edge portion of the support plate, and a horizontal arm pivotally mounted to said support plate and movable between a first position projecting laterally outward therefrom and in underlying supporting engagement with said table top and a second position folded against said support plate.

2. An accessory for a meat trimming saw incorporating a cutting blade past which a piece of meat is moved to sever an edge portion therefrom, said accessory comprising a plate-like member positionable laterally of the blade to overlie the meat being trimmed thereby, said member incorporating a lower edge which defines a guide edge along which the lean line of meat is guided to sever excess edge fat beyond a predetermined thickness, and a horizontal table top projecting laterally from said blade under and beyond said member, a vertical support plate underlying said top, said top having a groove defined in the undersurface thereof, said groove releasably receiving the top edge portion of the support plate, and a horizontal arm pivotally mounted to said support plate and movable between a first position projecting laterally outward therefrom and in underlying supporting engagement with said table top and a second position folded against said support plate.

3. Meat trimming apparatus comprising support structure, a vertically operating power cutting blade mounted on and driven from said support structure for the trimming of meat moved through and past said blade, a generally vertical plate-like member mounted on said support structure and positioned laterally outward of said blade to overlie the meat being trimmed by the blade, said member incorporating a lower edge which defines a guide edge along which the lean line of meat is guided to sever excess edge fat beyond a predetermined thickness, said member being mounted for lateral adjustment toward and away from the blade to vary the thickness of the edge fat to be retained beyond the lean line of meat.

4. The apparatus of claim 3 wherein said member is pivotally adjustable about a horizontal axis whereby a vertical adjustment of said member is effected by a pivoting of the plate about the axis, said member being overbalanced downward whereby vertical adjustment is automatic in accordance with the thickness of the meat passing therebelow.

5. The apparatus of claim 4 wherein said guide edge is arcuate.

6. The apparatus of claim 5 wherein the means mounting said member comprises a bracket fixed to the support structure and an elongated threaded shaft adjustably threaded through said bracket, said shaft pivotally mounting said member and defining said horizontal axis.

7. The apparatus of claim 6 wherein said member is enlarged and constitutes a guard between the cutting blade and the meat handler.

8. In combination with a meat trimming saw incorporating a vertically operating power cutting blade past which a piece of meat is moved to sever an edge portion therefrom, a horizontal table top projecting laterally from said blade to underlie and support a piece of meat, a vertical support blade underlying said top, said top having a groove defined in the undersurface thereof, said groove releasably receiving the top edge portion of the support plate, and a horizontal arm pivotally mounted to said support plate and movable between a first position projecting laterally outward therefrom and in underlying supporting engagement with said table top and a second position folded against said support plate.

* * * * *